(12) United States Patent
Tomitaka et al.

(10) Patent No.: US 8,702,122 B2
(45) Date of Patent: Apr. 22, 2014

(54) AIRBAG

(75) Inventors: Akihiro Tomitaka, Kanagawa (JP);
Kazumasa Misawa, Kanagawa (JP);
Mitsuru Mochiduki, Aichi (JP);
Shigeyuki Suzuki, Aichi (JP); Kenji Fujimura, Aichi (JP); Hiroshi Kato, Aichi (JP)

(73) Assignees: Toyota Motor East Japan, Inc., Miyagi (JP); Toyota Jidosha Kabushiki Kaisha, Aichi (JP); Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 12/677,757

(22) PCT Filed: Sep. 12, 2008

(86) PCT No.: PCT/JP2008/066610
§ 371 (c)(1),
(2), (4) Date: Jul. 8, 2010

(87) PCT Pub. No.: WO2009/035117
PCT Pub. Date: Mar. 19, 2009

(65) Prior Publication Data
US 2010/0295280 A1    Nov. 25, 2010

(30) Foreign Application Priority Data

Sep. 16, 2007 (JP) .................................. 2007-240300
Sep. 16, 2007 (JP) .................................. 2007-240302

(51) Int. Cl.
*B60R 21/231* (2011.01)

(52) U.S. Cl.
USPC .................................... 280/730.2; 280/730.1

(58) Field of Classification Search
USPC ................................ 280/730.1, 730.2, 743.2
See application file for complete search history.

(56) References Cited

U.S. PATENT DOCUMENTS 4,130,298 A * 12/1978 Shaunnessey ............. 280/730.1
5,172,790 A * 12/1992 Ishikawa et al. ............. 180/268
(Continued)

FOREIGN PATENT DOCUMENTS

JP    3-281458 A    12/1991
JP    2000-185618 A    7/2000
(Continued)

OTHER PUBLICATIONS

International Search Report (ISR) issued in PCT/JP2008/066610 for Examiner consideration.

(Continued)

*Primary Examiner* — Toan To
*Assistant Examiner* — Barry Gooden, Jr.
(74) *Attorney, Agent, or Firm* — Chen Yoshimura LLP

(57) ABSTRACT

An airbag (11) by which, when a vehicle (20) including two seats arranged in a vehicle width direction is subjected to a side collision, an occupant (P10, P11) sitting in a seat (22L, 22R) at the opposite side of the collision is restricted from moving to the collision side. The airbag (11) has, in the maximally-expanded status, an outline shape seen from the front side of the vehicle. This outline shape has: an airbag upper part (11U) that forms a part equal to or higher than a position corresponding to a shoulder of a seat back (25L, 23R) and that protects the neck and head for example of the occupant (P10, P11); and an airbag lower part (11D) that forms a part equal to or lower than a position corresponding to a shoulder of the seat back (25L, 23R) and that protects the shoulder and arm for example of the occupant (P10, P11). The airbag (11) is configured to have an entire shape that has the inner outline of the occupant (P10, P11) in the vehicle width direction.

10 Claims, 16 Drawing Sheets

(56) References Cited

U.S. PATENT DOCUMENTS

| | | | | |
|---|---|---|---|---|
| 5,222,761 | A * | 6/1993 | Kaji et al. | 280/730.2 |
| 5,378,011 | A * | 1/1995 | Rogerson et al. | 280/728.1 |
| 5,470,103 | A * | 11/1995 | Vaillancourt et al. | 280/730.1 |
| 5,499,840 | A * | 3/1996 | Nakano | 280/730.2 |
| 5,507,519 | A * | 4/1996 | Schettler-Kohler | 280/730.1 |
| 5,556,129 | A * | 9/1996 | Coman et al. | 280/730.2 |
| 6,142,521 | A * | 11/2000 | Shephard | 280/748 |
| 6,598,903 | B2 * | 7/2003 | Okada et al. | 280/743.2 |
| 6,773,026 | B2 * | 8/2004 | Meyer | 280/729 |
| 6,966,576 | B1 * | 11/2005 | Greenstein | 280/730.1 |
| 7,086,663 | B2 * | 8/2006 | Honda | 280/730.2 |
| 7,222,877 | B2 * | 5/2007 | Wipasuramonton et al. | 280/730.1 |
| 7,594,675 | B2 * | 9/2009 | Bostrom et al. | 280/730.2 |
| 7,971,901 | B2 * | 7/2011 | Tomitaka et al. | 280/730.2 |
| 2004/0051281 | A1 * | 3/2004 | Miyata | 280/730.1 |
| 2004/0074688 | A1 * | 4/2004 | Hashimoto et al. | 180/271 |
| 2005/0104340 | A1 | 5/2005 | Hasebe et al. | |
| 2007/0052213 | A1 * | 3/2007 | Miyata | 280/730.1 |
| 2007/0096444 | A1 * | 5/2007 | Bostrom et al. | 280/730.2 |
| 2009/0194981 | A1 * | 8/2009 | Mendez | 280/732 |
| 2010/0133797 | A1 * | 6/2010 | Kim et al. | 280/743.2 |
| 2010/0237595 | A1 * | 9/2010 | Fukuyama et al. | 280/730.2 |
| 2010/0264631 | A1 * | 10/2010 | Tomitaka et al. | 280/730.2 |
| 2010/0283230 | A1 * | 11/2010 | Tomitaka et al. | 280/730.2 |
| 2010/0314859 | A1 * | 12/2010 | Tomitaka et al. | 280/730.2 |
| 2011/0278826 | A1 * | 11/2011 | Fukawatase et al. | 280/730.2 |

FOREIGN PATENT DOCUMENTS

| | | |
|---|---|---|
| JP | 2004-217109 A | 8/2004 |
| JP | 2005-067272 A | 3/2005 |
| JP | 2005-145225 A | 6/2005 |

OTHER PUBLICATIONS

Written Opinion (PCT/ISA/237) issued in PCT/JP2008/066610.

* cited by examiner

AIRBAG

TECHNICAL FIELD

The present invention relates to an airbag for protecting an occupant of an automobile. In particular, the present invention relates to an airbag for restricting the move of the body of an occupant sitting at an opposite side of a side collision to the collision side due to the backlash by the collision.

BACKGROUND ART

As a protection device for reducing the impact to occupants when the automobile is subjected to a frontal collision, an airbag apparatus has been widely diffused. A conventional airbag apparatus is attached in a steering device or an instrument panel provided in front of an occupant. In the case of the conventional airbag apparatus, when the automobile is subjected to a frontal collision, the airbag is inflated at the front side of a driver seat and a front passenger seat to thereby restrain occupants sitting in the driver seat and the front passenger seat from moving to the front side. As a result, the occupants in the driver seat and the front passenger seat are effectively protected at the frontal collision of the automobile.

In recent years, protecting an occupant in an automobile at a side collision of the automobile also has been considered important. Thus, so-called side airbag apparatuses and curtain shield airbag apparatuses have been mounted in vehicles. Specifically, as shown in FIG. 12 for example, at the front passenger seat-side of an automobile 1, a curtain shield airbag apparatus 2 is placed so as to expand at the vicinity of the inner side of the glass at the upper part of a front door 1a. A side airbag apparatus 3 is placed so as to expand at the vicinity of the inner side of the lower part of the front door 1a. In FIG. 12, although the curtain shield airbag apparatus 2 and the side airbag apparatus 3 are shown only at the front passenger seat-side, the curtain shield airbag apparatus 2 and the side airbag apparatus 3 are also provided at the driver seat-side in an actual case.

When another vehicle 4 laterally collides with the automobile 1 as shown by the arrow X in FIG. 12, the curtain shield airbag apparatus 2 and the side airbag apparatus 3 are respectively inflated at a position close to the inner sides of the front door 1a, i.e., an outer region of the front passenger seat, to thereby protect the body of the occupant of the front passenger seat from having a direct contact with the front door 1a.

On the other hand, Patent Publication 1 discloses an airbag apparatus that is attached in the ceiling of the vehicle interior and that is designed, when the automobile is subjected to a frontal collision, to expand downwardly to the front side of the occupant.

Patent Publication 2 discloses an airbag apparatus that is provided in a console between a driver's seat and a front passenger seat and that is designed to expand, at the side collision of the automobile for example, between the seat back of the driver's seat and the seat back of the front passenger seat.

Patent Publication 3 discloses, for example, an airbag apparatus that is attached in an instrument panel in front of the front passenger seat and that is designed so that the airbag body is expanded at the front side of the occupant of the front passenger seat at the frontal collision of the automobile, a panel member provided in the vicinity of the ceiling is rotated in the lower direction, and a part of the airbag body expanded to the inner side of the vehicle interior is restricted from being moved to the rear side in the vicinity of the ceiling so as to be prevented from being expanded between the head of the occupant and the ceiling.

Patent Publication 4 discloses, for example, an airbag apparatus that is attached in the instrument panel in front of the front passenger seat, that is designed so that the main airbag body divided to left and right parts is caused, at the frontal collision of the automobile, to expand in front of the occupant of the front passenger seat and the ceiling airbag body provided in the vicinity of the ceiling of the front passenger seat is caused to expand in the lower direction and is engaged with a space between the divided left and right parts of the main airbag body expanded to the inner side of the vehicle interior to restrict the dislocation of the main airbag in the lateral direction to thereby prevent the main airbag from expanding in an unexpected direction.

Patent Publication 1: JP2000-185618A
Patent Publication 2: JP2004-217109A
Patent Publication 3: JP2005-067272A
Patent Publication 4: JP2005-145225A

DISCLOSURE OF THE INVENTION

Problem to be Solved by the Invention

However, in the curtain shield airbag apparatus 2 and the side airbag apparatus 3 shown in FIG. 12, a risk is caused where, at a side collision, an occupant at the opposite side of the side collision, i.e., an occupant at the driver's seat-side in shown case, may be moved as shown by the arrow A by inertia to the collision side.

In the airbag apparatus according to Patent Publication 1, at a frontal collision, the airbag is expanded from the ceiling to the front side of an occupant in the rear seat in order to protect the occupant. However, this airbag apparatus is not configured so as to restrict, at a side collision, an occupant from moving to the collision side.

In the airbag apparatus in Patent Publication 2, at a side collision for example, the airbag is allowed to expand between the seat back of the driver's seat and the seat back of the front passenger seat to disperse the load applied from the impact of the side collision to the driver's seat or the front passenger seat via the seat back to the seat back of the front passenger seat or the seat back of the driver's seat while transmitting the load to thereby suppress the driver's seat or the front passenger seat from falling to the opposite side of the side collision. Therefore, the airbag apparatus of Patent Publication 2 is not configured so as to restrict, at a side collision, the occupant from moving to the collision side.

Furthermore, the airbag apparatuses according to Patent Publication 3 and Patent Publication 4 also have an objective of protecting an occupant at a frontal collision and are not configured so as to restrict, at a side collision, an occupant from moving to the collision side.

The present invention has been made in view of the above points. It is an objective of the invention to provide an airbag that suppresses, at a side collision, an occupant from moving due to the impact in the lateral direction.

Means for Solving the Problem

In order to achieve the above objective, the present invention is an airbag that is expanded between two seats arranged in a vehicle width direction. In an expanded status, an outline of a vertical cross section along a vehicle width direction forms a shape in which a vicinity of a center in a height direction is protruded to both sides in the vehicle width direction. This outline shape may be a polygonal shape. The polygonal number of this polygonal shape is preferably an even number of 4 or more.

The airbag according to the present invention preferably forms, at the expansion thereof, a three-dimensional shape composed of a front face, a back face, an upper face, a lower face, and left and right side faces protruding in a convex manner to both sides in the vehicle width direction.

The airbag according to the present invention is preferably planarly configured by two left and right flat fabric cloths.

The airbag of the present invention may be an airbag expanding between two seats arranged in a vehicle width direction, the airbag having an outline shape seen from the front side of the vehicle in the maximally-expanded status, composed of an airbag upper part that forms a part equal to or higher than a position corresponding to a shoulder of a seat back and that protects the neck and head for example of the occupant, and an airbag lower part that forms a part equal to or lower than a position corresponding to a shoulder of the seat back and that protects the shoulder and arm for example of the occupant, wherein the airbag upper part has the outermost part in the vehicle width direction that reaches the vicinity of an inner end of a headrest provided at the center of the upper part of each of the left and right seat backs in the vehicle width direction, the airbag lower part has the outermost part in the vehicle width direction that reaches the vicinity of inner ends of the left and right seat backs in the vehicle width direction and, the airbag has an entire shape so as to have an inner outline of the occupant in the vehicle width direction.

The airbag is desirably configured, in the maximally-expanded status thereof, so that an upper face of the airbag upper part is abutted to a vehicle interior ceiling of the vehicle and a lower face of the airbag lower part is abutted to an upper face of an armrest of a center console.

The airbag upper part desirably has an outline shape in a horizontal cross-section in the maximum width portion in the vehicle width direction that has the maximum width in the vicinity of the backmost part of the center console and completely covers the backmost part of the center console in the vehicle width direction and the entirety has a substantially bell-like shape having a reduced width toward the front side to have a narrow tip end.

The airbag lower part is desirably entirely configured so that a width in the vehicle width direction is wider than the width of the center console in the vehicle width direction, an outline shape of a horizontal cross-section at a position corresponding to a shoulder of the seat back has a rear part in the vicinity of the backmost part of the center console and a front part in the vicinity of the front end of a seat cushion so that the rear part and the front part have substantially the same maximum width in the vehicle width direction, and an intermediate portion of the rear part and the front part has a relatively narrow width in the vehicle width direction.

Furthermore, the airbag is an airbag that is expanded between two seats arranged in a vehicle width direction, wherein the airbag includes a tether for limiting the expansion of the airbag, and this tether part has a horizontal cross-section configured so that a length at a front end in a vehicle width direction is shorter than a length at a rear end in the vehicle width direction.

Effect of the Invention

According to the present invention, at a side collision, the airbag is expanded in the center region in the vehicle width direction in the vehicle interior. As a result, when a load is applied to the occupant by the impact of the collision and the body of the occupant at the collision opposite side is moved to the collision side to thereby push the airbag to the collision side, this airbag absorbs the traveling force of the body of the occupant at the collision opposite side, thereby protecting the occupant at the collision opposite side. Furthermore, since the airbag have side faces formed so as to be protruded in the vicinity of the center in the height direction to both sides in the vehicle width direction, a space is secured between the head and the neck of the occupant and the airbag side face.

As a result, even when the body of the occupant at the impact opposite side is inclined or is dislocated from the sitting position, a wrap amount at which the side face of the expanded airbag interferes with the head and the neck of the occupant is reduced. Thus, the side effect is reduced and the injury value of the occupant may be reduced.

When the airbag has a planar configuration composed of two flat left and right fabric cloths, the airbag itself has a planar shape. Thus, the airbag itself can be manufactured easily and the manufacture cost is reduced.

The airbag that expands at a side collision between seats adjacent to each other in the vehicle width direction configures, in order to have the outline shape of the inner side face in the vehicle width direction of the occupants sitting in the seats, a three-dimensional shape of the airbag at the maximum expansion thereof. This can consequently restrain the head, the neck, the chest, and the abdomen at substantially the same timing. Thus, the injury values caused to the occupant can be dispersed to thereby reduce the injury values in a balanced manner, thereby preventing a severe injury value from locally occurring.

By the improvement of the airbag shape in the vehicle front-and-rear direction and the shape in the vehicle width direction, even in the case of a vehicle including a center console, the entire range from the armrest to the upper end of the vertical part can be covered. This can consequently suppress the direct collision of the occupant with the center console to reduce the injury value of the occupant caused from the center console.

Furthermore, according to the present invention, the airbag has a concave shape in the vehicle front-and-rear direction in which the front part and the rear part are relatively wide and the width at the center in the vehicle front-and-rear direction is set to be relatively narrow. As a result, the occupant is easily restrained at this concave shape to thereby provide an improved restraint performance to the airbag. Furthermore, the airbag is shaped so that the tip end at the lower side of the shoulder of the occupant is shaped to have a reduced width toward the tip end. Thus, even when the occupant is not in a standard sitting status, the injury value of the occupant caused by the airbag can be reduced.

DESCRIPTION OF THE REFERENCE NUMERALS

Figure 1:
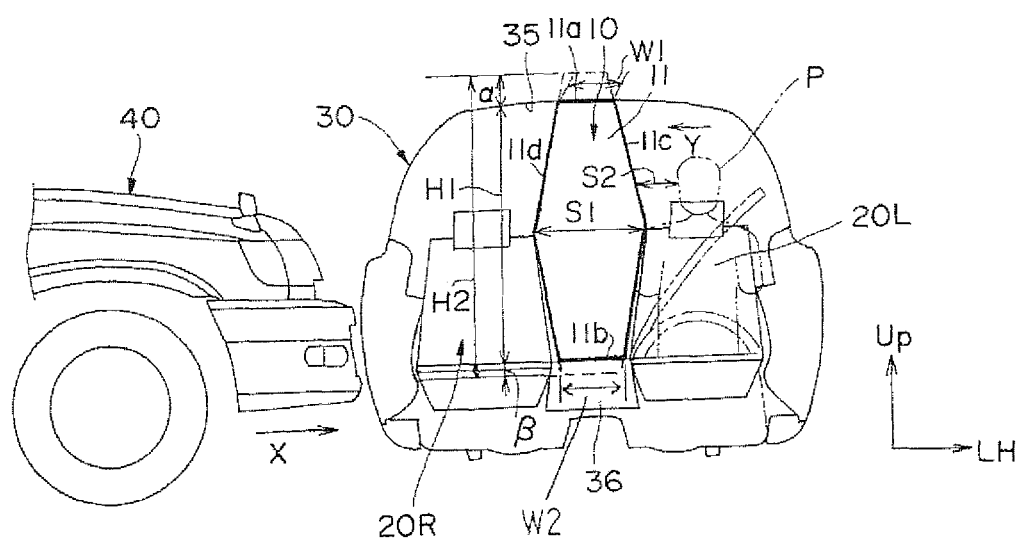
FIG. 1 is a schematic front view illustrating a configuration in the usage status of the first embodiment of an airbag apparatus including the airbag according to the present invention seen from the vehicle front side.

10 Airbag apparatus
11 Airbag
11A and 11B Fabric cloth
12 Inflator
13 Case
20L and 20R Seat
30 Vehicle
35 Vehicle interior ceiling
36 Vehicle interior lower side
40 Another vehicle
111 Airbag
111B Airbag rear part
111D Airbag lower part
111F Airbag front part
111MB Airbag backmost part
111U Airbag upper part
111sL and 111sR Concave part
120 Vehicle
121 Center console
121B Center console base part
121H Center console armrest
121V Center console vertical part
122L and 122R Seat
123L and 23R Seat cushion
124L and 124R Seat back
125 Vehicle interior ceiling
126L and 126R Headrest
P11 and P12 Occupant
P110 and P111 Occupant
P110a and P111a Head
P110b and P111b Shoulder

BEST MODE FOR CARRYING OUT THE INVENTION

The following section will describe the present invention in detail based on some embodiments shown in the drawings. In the drawings, Fr represents the vehicle front side, Up represents the vehicle upper side, and LH represents the left side in the vehicle direction.

Figure 3:
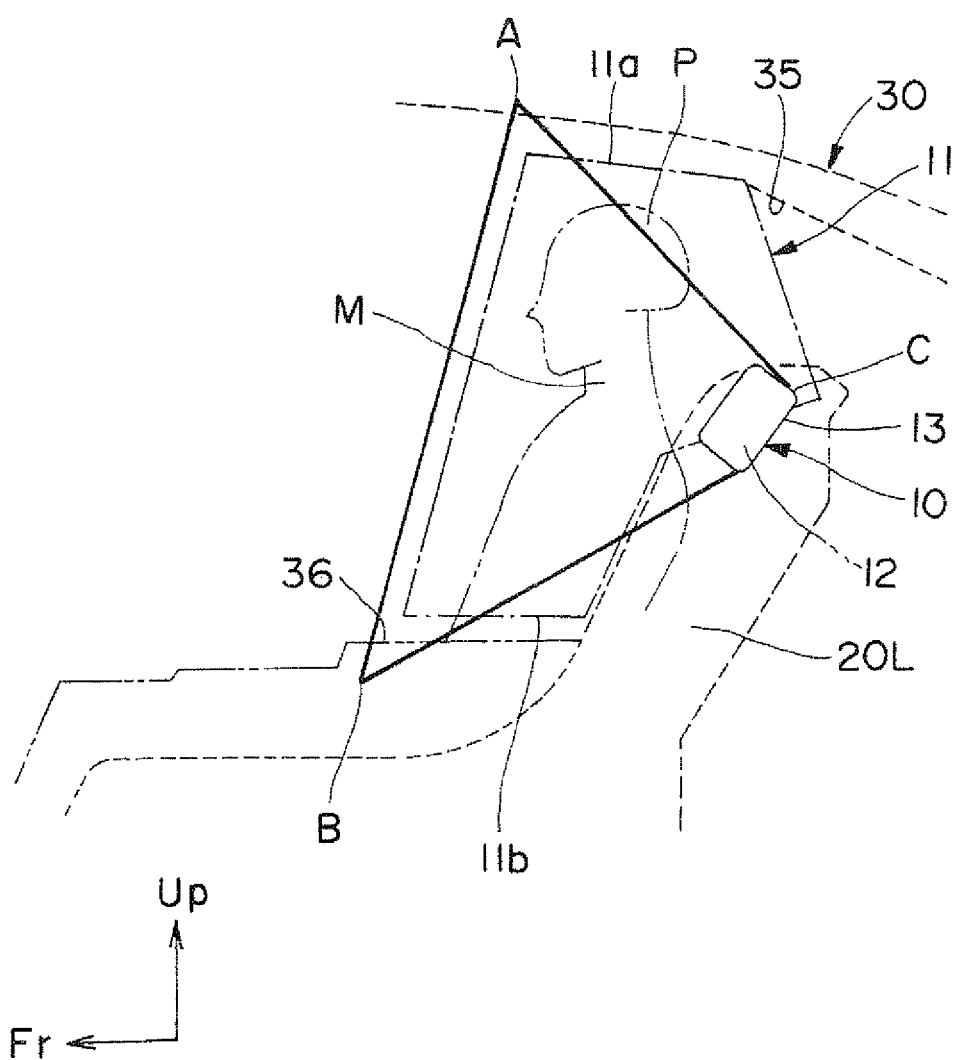
FIG. 3 is a schematic side view illustrating the airbag of FIG. 1.

FIG. 1 and FIG. 3 illustrate the usage status (expanded status) of the first embodiment of the airbag apparatus according to the present invention. According to an airbag apparatus 10, an airbag 11 is allowed to expand in a region between two seats 20L and 20R so that, when a vehicle 30 including two seats 20L and 20R arranged to be parallel to each other in the vehicle width direction has a side collision with another vehicle 40, i.e., a side collision from the vehicle right side with another vehicle 40 in the shown example, the body of the occupant P sitting in the seat 20L of the collision opposite side is restricted from moving to the collision side.

To realize this, the airbag apparatus 10 is provided between the seat backs of the two seats 20L and 20R. The airbag apparatus 10 includes an inflator 12 for jetting gas into the airbag 11 in order to expand the airbag 11.

Although not shown, in a normal status where no collision occurs, this airbag 11 is accommodated in a folded status in a case 13. When the seat backs of the two seats 20L and 20R have therebetween a partition member (not shown) raised from the vehicle interior floor, this case 13 is attached to the partition member. The inflator 12 is also provided in the case 13.

At a side collision, the impact is detected by a sensor (not shown) attached to the vehicle body of the automobile. The detection triggers the inflator 12 to jet gas into the airbag 11, thereby expanding the airbag 11.

The airbag apparatus 10 is supported by a vehicle body constituting member such as a reinforce (not shown) provided at the back side of a panel 18. The airbag apparatus 10 is configured so that the airbag 11 and the inflator 12 are included in a case (housing) 17.

The airbag 11 is configured to have a bag-like shape having a gas inflow opening and is formed by stitching a fabric cloth made of a polyester yarn or a polyamide yarn. The inflator 12 has a gas discharge outlet (not shown) through which the gas for expanding the airbag 11 is discharged. The inflator 12 is formed to have a substantially columnar shape.

Figure 2:
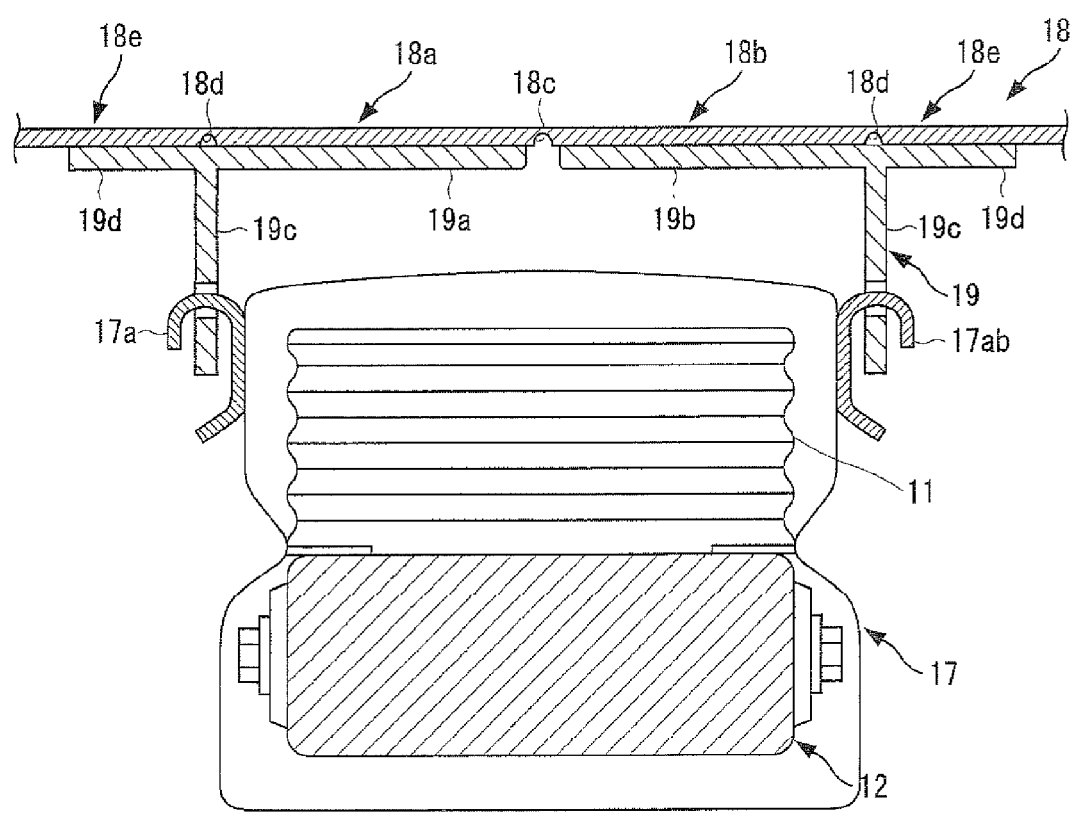
FIG. 2 is a schematic cross-sectional view illustrating the stored status of the airbag of FIG. 1.

The panel 18 is formed by providing two rectangular airbag doors 18a and 18b so as to be adjacent to each other so that both of the airbag doors 18a and 18b can be opened at the boundary therebetween. As shown in FIG. 2, the panel 18 has a dotted line or straight line-like cut that is formed along the boundary of the two airbag doors 18a and 18b and the outline thereof. The cut at the boundary of the two airbag doors 18a and 18b is denoted with the reference numeral 18c and the cut along the outline is denoted with the reference numeral 18d. These cuts 18c and 18d are formed along the vehicle front-and-rear direction and over the entire length of the airbag doors 18a and 18b.

The panel 18 is configured as a synthetic resin-made panel base member that is formed by polypropylene (PP) for example to have a predetermined shape. The panel 18 may be configured by adhering covering material over the outer surface of this panel base member.

The airbag doors 18a and 18b and the peripheral 18e formed at predetermined positions of the panel 18 are supported by a retainer 19 that is locked to the airbag apparatus provided at the back side of the panel.

The retainer 19 is connected to the airbag apparatus so that the shattering of the airbag doors 18a and 18b for example may be prevented during the airbag deployment. As shown in FIG. 2, this retainer 19 includes: door support units 19a and 19b; a side plate units 19c formed from the base ends of the door support units 19a and 19b to the inner side of the vehicle interior member to have a substantially plate frame-like shape so as to surround the four corners of the airbag apparatus; and a peripheral support unit 19d.

The door support units 19a and 19b support the airbag doors 18a and 18b and are fixed to the airbag doors 18a and 18b in order to prevent the shattering of the airbag doors 18a and 18b when the doors are opened. As shown in FIG. 2, the door support units 19a and 19b are separated at a region along the cut 18c at the boundary of the two airbag doors 18a and 18b. Thus, the two door support units 19a and 19b, and 131 are fixed to the back face of the panel 10 so as to support the respective airbag doors 18a and 18b.

The side plate unit 19c is a plate-like panel member raised from the base end of each of the door support units 19a and 19b adhered to the back face of each of the airbag doors 18a and 18b to the airbag apparatus at the back side of the panel 18. As shown in FIG. 2, the tip end of this side plate unit 19c is locked to each of the hooks 17a and 17b of the airbag apparatus for example. This side plate unit 19c also has a function to guide a direction along which an airbag (not shown) is deployed at the expansion thereof.

The peripheral support unit 19d supports the panel 18 at the periphery of the airbag door and is fixed so as to be adhered to the back face of the panel of the periphery.

The retainer 30 is integrally formed by resin molding. This resin material may be olefin-base thermoplastic elastomer (Thermo Plastic Olefin, so-called TPO) but also may be other materials. The retainer 19 is not limited to resin material and may be material such as steel.

Next, the following section will describe the shape of the airbag 11 when the airbag 11 is expanded at the highest level (hereinafter referred to as "at expansion").

Figure 4:
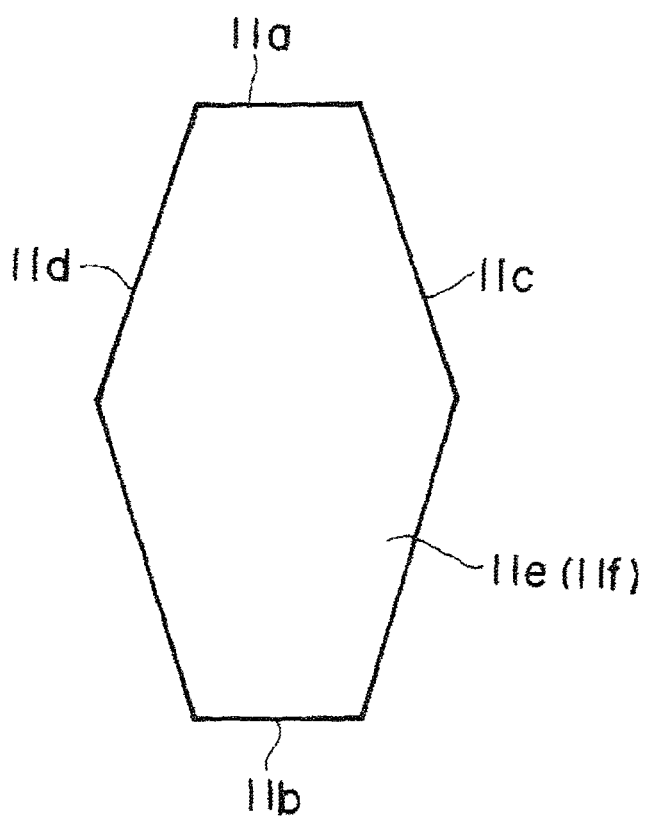
FIG. 4 is an expanded front view illustrating the airbag of FIG. 1.

As shown in FIG. 4, the airbag 11 is made of fabric cloth and is formed to have a bag-like shape. At the expansion thereof, the upper end 11a is abutted to a vehicle interior ceiling 35 and the lower end 11b is abutted to a vehicle interior lower side 36. When the vehicle interior ceiling 35 is attached with various devices for example, the upper end of the airbag 11 would be abutted, at the expansion thereof, via the various devices for example to the vehicle interior ceiling 35. The vehicle interior lower side 36 abutted to the lower end 11b of the airbag 11 at the expansion thereof is a center console in the shown case. However, the vehicle interior lower side 36 may be a vehicle interior floor or a seat cushion for example depending on the structure of the automobile.

The airbag 11 is formed, at the expansion thereof, so that both side faces 11c and 11d in the vicinity of the middle in the height direction are protruded to both sides in the vehicle width direction. In the shown case, the airbag 11 is formed, at the expansion thereof, to have a cross-sectional shape in which both side faces 11c and 11d are protruded to the left and right occupants, i.e., to have the entire rhombus or hexagonal cross-sectional shape. The airbag 11 is also formed so that the front face 11e and the back face 11f are flat.

Figure 13:
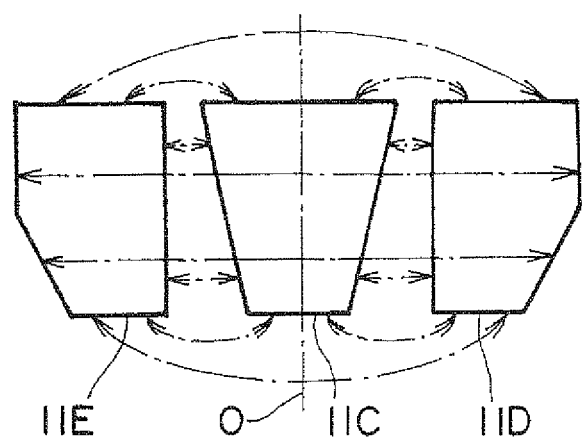
FIG. 13 is a development view illustrating the fabric cloth constituting an airbag having another shape.

By the way, in the case of a conventional design in which the airbag is formed to have a trapezoidal shape or a reverse triangular shape in which the upper side is larger than the lower side in the cross section in the vehicle width direction, the airbag is configured as shown in FIG. 13 to have a three-dimensional shape composed of three fabric cloths 11C, 11D, and 11E. In this case, the center fabric cloth 11C is sewn with the edges of the fabric cloths 11D and 11E (shown by the arrow of the chain line) provided at symmetric positions to the center line O, thereby forming a bag-like shaped airbag. This causes a complicated process for manufacturing the airbag to increase the time and cost. This also causes, at the expansion of the airbag, a reduced distance between the head and neck of the occupant at the collision opposite side and the side face of the airbag.

Figure 5:
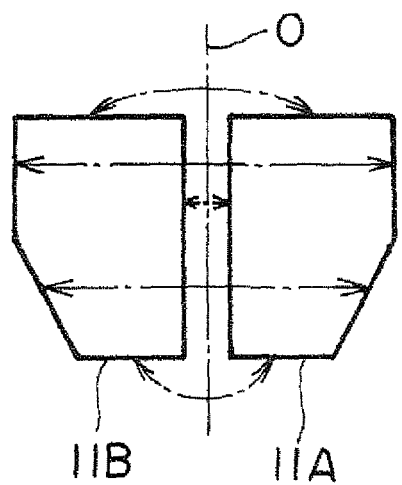
FIG. 5 is a development view of the fabric cloth constituting the airbag of FIG. 1.

To solve this, the airbag 11 is configured as shown in FIG. 5 to have a planar configuration composed of two left and right flat fabric cloths 11A and 11B. These fabric cloths 11A and 11B are stitched at the edges (shown by the arrow of the chain line) that are at symmetric positions to the center line O in the drawing, thereby forming the bag-like shaped airbag 11.

In order to allow, at the expansion of the airbag 11, the upper end 11a and the lower end 11b of the airbag 11 to be abutted to the vehicle interior ceiling 35 and the vehicle interior lower side 36 with a predetermined pressure, the airbag 11 is set to have the maximum expansion distance H2 in the up-and-down direction that exceeds the distance between the vehicle interior ceiling 35 and the vehicle interior lower side 36 (vehicle interior height H1). Specifically, the airbag 11 is formed, at the expansion thereof, so that the upper end 11a and the lower end 11b of the airbag 11 have an expansion margin $\alpha$ and an expansion margin $\beta$, respectively.

By doing this, even after the airbag 11 is abutted, at the expansion thereof, to the vehicle interior ceiling 35 and the vehicle interior lower side 36, the airbag 11 continuously expands to the maximum expansion distance H2 to be abutted to the vehicle interior ceiling 35 and the vehicle interior lower side 36 with a predetermined pressing force. At the same time, the areas W1 and W2 are increased at which the upper end 11a and the lower end 11b are abutted to the vehicle interior ceiling 35 and the vehicle interior lower side 36, thus causing a strong friction force.

Furthermore, the airbag 11 is configured as shown in FIG. 3 so as to expand to the front side from an attachment position of the case 13 between the seat backs. Thus, when the airbag is seen from a side, a triangle ABC is formed by an abutting position A at which the upper end 11a of the airbag 11 is abutted to the vehicle interior ceiling 35, an abutting position B at which the lower end 11b is abutted to the vehicle interior lower side 36, and an attachment position C at which the airbag 11 is attached. The inner region of this triangle ABC accommodates the load center M of the occupant P.

The airbag apparatus 10 according to this embodiment has the configuration as described above. In a normal status, i.e., when the airbag 11 is not expanded, the airbag 11 is stored in the case 13.

When the vehicle in this status has, for example, a right side collision as shown by the arrow X in FIG. 1 with another vehicle 40, the impact is detected by a not-shown sensor. This detection triggers the inflator 12 to jet gas into the airbag 11. As a result, the airbag 11 is expanded as shown in FIG. 1 and FIG. 3 between the two seats 20L and 20R. Then, the airbag 11 is formed so that the upper end 11a and the lower end 11b thereof are securely abutted to the vehicle interior ceiling 35 and the vehicle interior lower side 36 by the above-described expansion margins $\alpha$ and $\beta$ in a planer manner to cause friction.

In accordance with the expansion of the airbag 11, both side faces 11c and 11d are protruded to both sides in the vehicle width direction in the vicinity of the middle positions of the height direction, respectively. Thus, in FIG. 1, even when the occupant sitting at the opposite side to the side collision (collision opposite side), i.e., the occupant P sitting in the front passenger seat-side seat 20L, receives the load caused by the impact of the side collision toward the collision side as shown by the arrow Y, the body of the occupant P flexibly strikes the already-expanded airbag 11. Thus, the airbag 11 applies a reaction force to the occupant P. This consequently restricts the move of the body of the occupant P to the collision side.

The airbag 11 has both side faces 11c and 11d that are protruded to both sides in the vehicle width direction in the vicinity of the middle in the height direction. Thus, when a side collision causes the side face 11c of the expanded airbag 11 to strike the body of the occupant P, a space S1 in the vehicle width direction in the inner space of the airbag 11 for absorbing this impact is sufficiently secured. Thus, the load to the occupant due to the impact of the side collision is securely absorbed, thereby protecting the occupant P.

Conventionally, an airbag has a controlled expanded status so as to prevent a direct collision with the occupant in a normal sitting status. However, when the airbag is expanded while the body of the occupant is being inclined or dislocated from the sitting position, i.e., while the body of the occupant is being at a so-called Out Of Position (hereinafter referred to as OOP), a so-called side effect may be caused where the impact by the airbag expansion causes a damage to the occupant. In the case of an airbag expanding between seats in particular, the expanded airbag may strike the head or neck of the occupant with a high probability. Thus, when the distance between the expanded airbag and the head or neck of the occupant is reduced, the injury value increases in inverse proportion with this distance.

Figure 14:
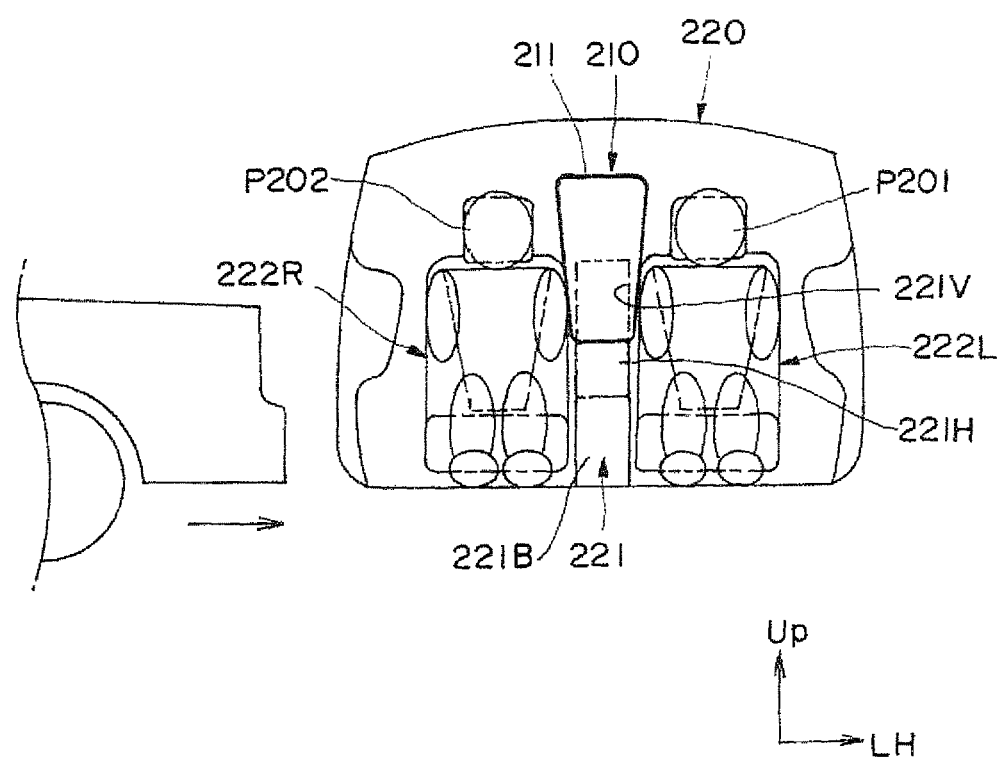
FIG. 14 is a schematic view illustrating the configuration of an airbag expanded via a center console between two seats arranged in a vehicle width direction seen from the vehicle front side.
Figure 15:
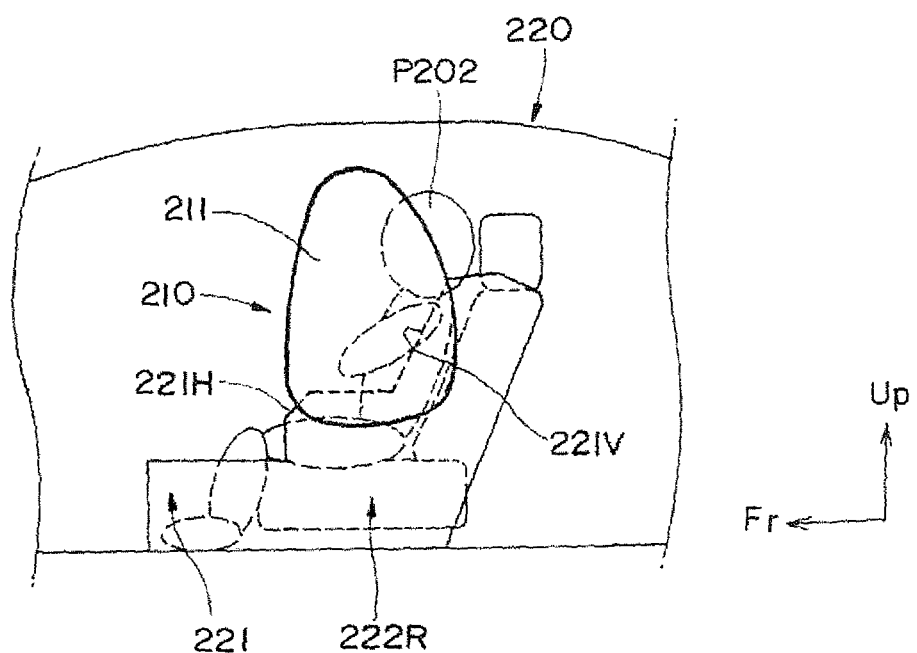
FIG. 15 is a partial perspective side view illustrating the configuration of the airbag of FIG. 14.
Figure 16:
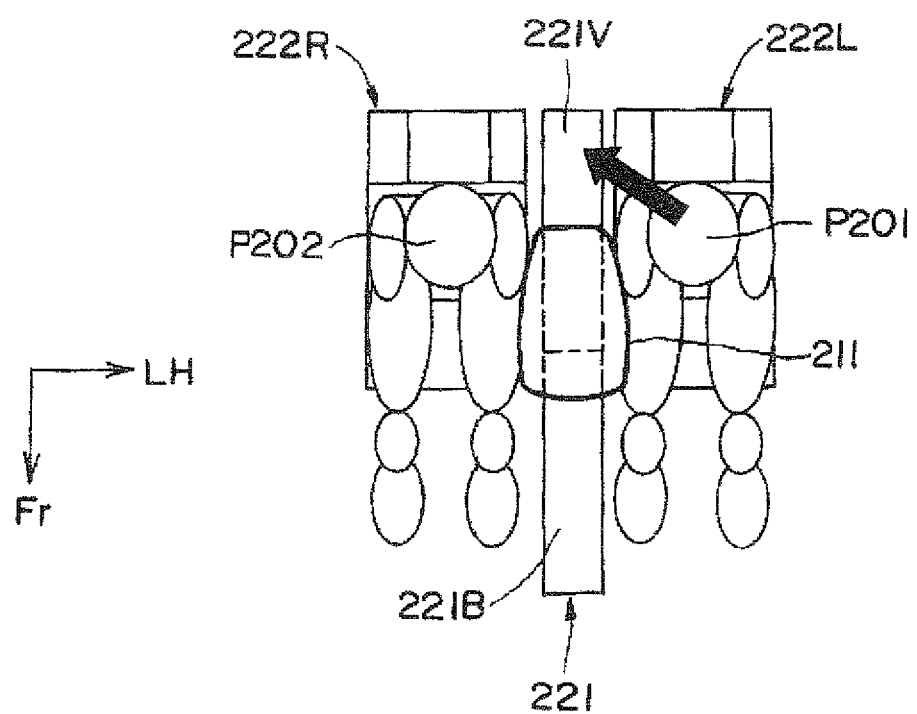
FIG. 16 is a top view illustrating the configuration of the airbag of FIG. 14.

Furthermore, in the case of an airbag 211 having the configurations as shown in FIG. 14 to FIG. 16, the airbag 211 expanded in a center console 221 does not reach the vehicle interior ceiling. Thus, when a side collision to a vehicle 220 is in a direction for example from the right rear side of the vehicle 220 to the left front side of the vehicle 220, as shown in FIG. 16, an occupant P201 at the collision opposite side is moved in the direction shown by the thick arrow in FIG. 16. Thus, there is a probability where the occupant may have a contact with the vertical part 221V of the center console 221 at a position corresponding to the seat back.

Furthermore, as shown in FIG. 14 to FIG. 16, when the outline shape of the airbag 211 at the maximum expansion thereof seen from the front side of vehicle 220 has a three-dimensional shape that merely occupies the upper side of an armrest 221H of the center console 221 to separate the left and right seats 222L and 222R, and when a side collision is caused immediately lateral to the vehicle 220 to cause the move of the occupant P201/P202 immediately lateral to the collision opposite side, the shoulder or arm of the occupant P201/P202 can be protected, but a space is caused in a range from the shoulder to the head side part between the head side part and the airbag 211.

Figure 6:
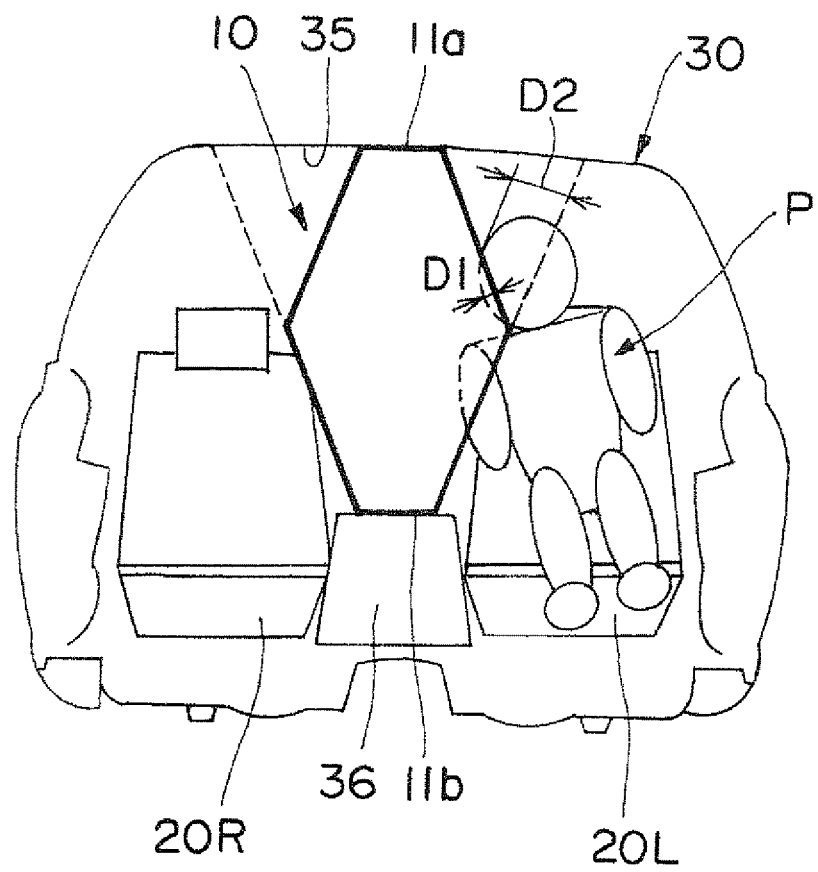
FIG. 6 is a schematic front view illustrating the usage status of the airbag of FIG. 1 when the occupant is dislocated from a sitting position.

In this embodiment, as shown in FIG. 1, the airbag 11 has both side faces 11c and 11d that are protruded in the vicinity of the middle in the height direction to both sides in the vehicle width direction. This consequently secures a space S2 between the side face 11c of the expanded airbag 11 and the head and neck of the occupant P. As a result, even when the occupant P is dislocated from the sitting position of the seat 20L as shown in FIG. 6 and is in the OOP status, the wrap amount D1 at which the side face 11c of the expanded airbag 11 interferes with the head of the occupant P is significantly smaller than the wrap amount D2 at the expansion thereof of the side face 11c (shown by the dotted line in FIG. 6) in the case of the airbag 11 made of the fabric cloth shown in FIG. 13.

Thus, even when the occupant P is in the OOP status, the occupant P can have a smaller injury value when the body of the occupant P at the collision opposite side is moved, at a side collision, to the collision side. Thus, the side effect is reduced and the occupant P is securely protected.

Furthermore, when the body of the occupant P at the collision opposite side strikes, at a side collision, the side face 11c of the expanded airbag 11, the load center M of the occupant P acts on the inner region of the triangle ABC composed of the abutting positions A and B at which the upper end 11a and the lower end 11b of the airbag 11 are abutted to the vehicle interior ceiling 35 and the vehicle interior lower side 36 and attachment position C of the airbag 11. Thus, the region in the vicinity of the load center M of the body of the occupant P is covered by the side face 11c of the airbag 11. This prevents, at a side collision, the dislocation from the airbag 11 of the body of the occupant P at the collision opposite side, thus protecting the occupant P securely.

Figure 7:
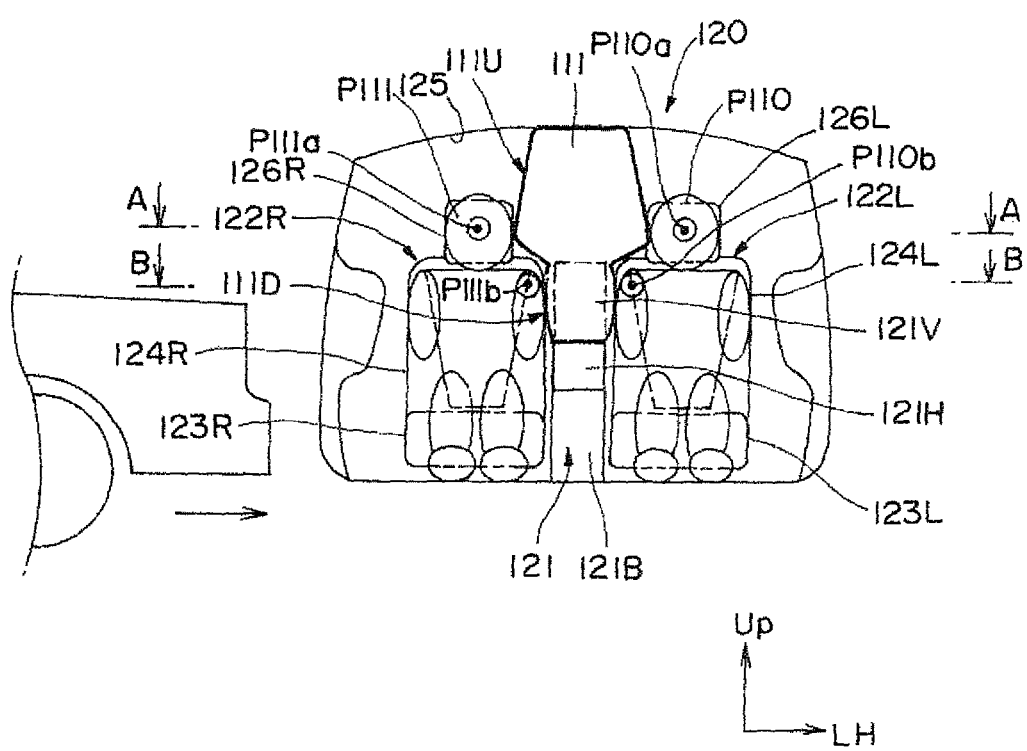
FIG. 7 is a front view illustrating the usage status of the airbag according to the second embodiment of the present invention.

FIG. 7 illustrates the usage status of an airbag 111 according to the second embodiment of the present invention seen from the front side of a vehicle 120. This airbag 111 is structured to expand between left and right seats 122L and 122R when the vehicle 120 including the two seats 122L and 122R arranged in the vehicle width direction via a center console 121 has a side collision with another vehicle (not shown).

Although not shown, in a normal usage status where no side collision occurs, the airbag 111 is in a folded status and is stored in an airbag storage means (not shown) formed in the center console 121. An inflator (not shown) for jetting gas to be supplied to the interior of this folded airbag 111 is provided in the airbag storage means (not shown). An impact at a side collision is detected by a sensor attached to the vehicle body. The detection triggers the inflator to jet gas therefrom, thereby causing the airbag 111 to expand.

The center console 121 of this embodiment is configured to include: a base part 121B that is provided between the left and right seats 122L and 122R and that extends from the rear end positions of seat cushions 123L and 123R of the seats 122L and 122R to a footrest space 124 at the front side of the seat cushions 123L and 123R in a substantially horizontal manner; an armrest 121H that is provided at the upper part of this base part 121B and that extends from the base end positions of seat backs 125L and 125R to the front end positions of the seat cushions 123L and 123R in a substantially horizontal manner; and a vertical part 121V that is inclined from the rear end portion of this armrest 121H to the slightly rear side and that extends in the upward direction in the vehicle height direction to a position slightly higher than the upper ends of the seat backs 125L and 125R.

In the vicinity of the upper end of the center console 121 at a position corresponding to the shoulders of the seat backs 125L and 125R, an airbag storage means (not shown) is provided to store the airbag 111 folded in an expandable manner.

Next, the following section will describe the shape of the airbag 111 when the airbag 111 is expanded at the highest level (hereinafter referred to as "at expansion"). As shown in FIG. 7, the airbag 111 at the expansion thereof has an airbag upper part 111U that forms a part equal to or higher than the positions corresponding to shoulders of the seat backs 125L and 125R and that protects the neck and heads P110a and P111a for example of the occupants P110 and P111 and an airbag lower part 111D that forms a part equal to or lower than the positions corresponding to shoulders of the seat backs 125L and 125R and that protects shoulders P110b and P111b and arms for example of the occupants P110 and P111.

The airbag 111 has the entire outline shape that substantially has the inner outline of each of the occupants P110 and P111 in the vehicle width direction. In particular, the outermost part of the airbag upper part 111U in the vehicle width direction is configured so as to reach the vicinity of the inner ends of headrests 126L and 126R in the vehicle width direction that are provided at the center of the upper part of the seat backs 125L and 125R. The outermost part of the airbag lower part 111D in the vehicle width direction is configured so as to reach the vicinity of the inner ends of the seat backs 125L and 125R in the vehicle width direction.

The airbag 111 is configured so that airbag upper part 111U is abutted to the vehicle interior ceiling 125 of the vehicle 120 and the airbag lower part 111D is abutted to the upper face of the armrest 121H of the center console 121. When the vehicle 120 is subjected to a side collision, the friction is caused between the airbag 111 and the vehicle interior ceiling 125 and the armrest 121H to thereby restrain the airbag 111 in a stable manner.

Figure 8:
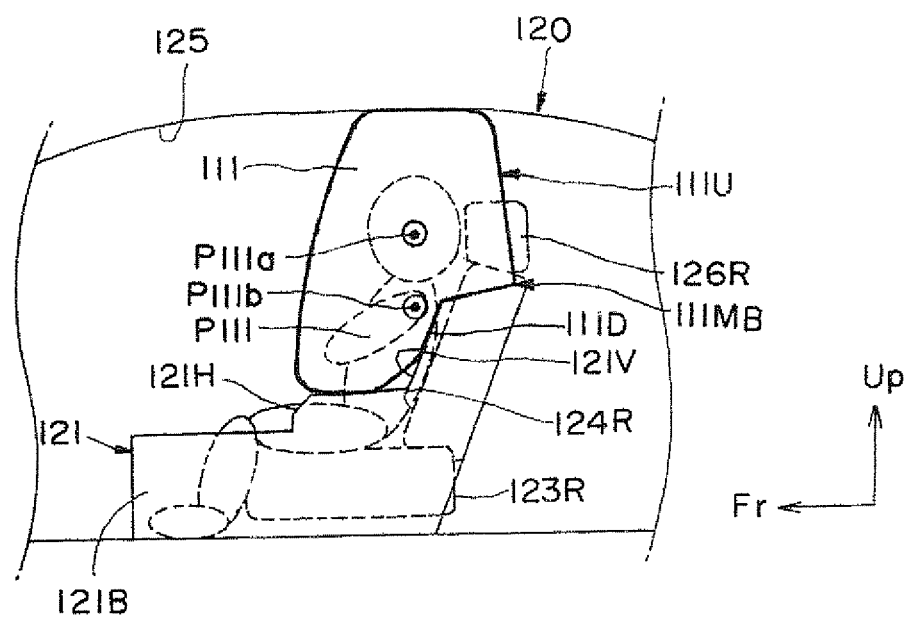
FIG. 8 is a partial perspective view illustrating the airbag periphery in FIG. 7 seen from the right side.

As shown in FIG. 8, the airbag upper part 111U is formed so as to protrude with an angle to the rear side so that the rear part thereof in the front-and-rear direction of the vehicle 120 reaches the vicinity of the backmost part of the center console 121 and the width in the front-and-rear direction of vehicle 120 is narrower from the lower part toward the upper part of the airbag upper part 111U. The airbag lower part 111D has an outline shape in the front-and-rear direction of the vehicle 120 that has a substantially parallelogram shape in which the inclination from the lower part to the upper part is slightly inclined from the front side of the vehicle 120 to the rear side. FIG. 8 is a partial perspective view illustrating the airbag 111 in FIG. 7 seen from the right side.

Figure 9:
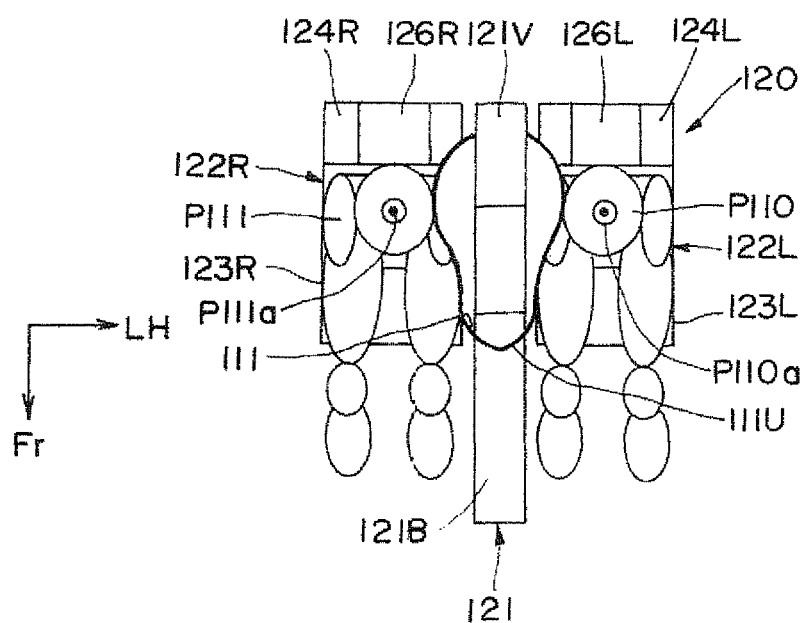
FIG. 9 is a cross-sectional view taken along the line A-A in FIG. 7.

The airbag upper part 111U has the outline shape of the horizontal cross-section in the maximum width portion in the vehicle width direction that is formed, as shown in FIG. 9 showing the cross section taken along A-A in FIG. 7, so that the entirety has a reduced width toward the front side to have a significantly-narrow tip end to form a substantially bell-like shape. The backmost part 111MB is configured to form the maximum width and to completely cover the vicinity of the rear end of the center console 121 in the vehicle width direction. The backmost part 111MB is configured so that the injury value caused by the vertical part 121V can be reduced when the vehicle 120 is subjected to a side collision and when the occupants P110 and P111 sitting at the collision opposite side move to the collision side and when the vertical part 121V of the center console 121 strikes the heads P110a and P111a, the neck or the shoulders P110b and P111b or the arm for example.

Figure 10:
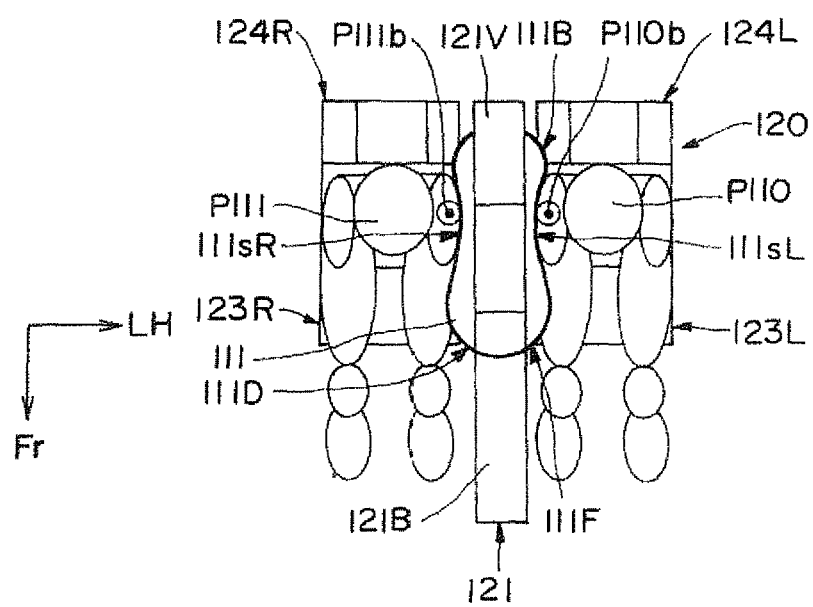
FIG. 10 is a cross-sectional view taken along the line B-B in FIG. 7.

As shown in FIG. 10 illustrating a cross section taken along B-B in FIG. 7, the airbag lower part 111D is entirely configured so that the width thereof in the vehicle width direction is wider than the width of the center console 121 in the vehicle width direction. The airbag lower part 111D has the outline shape of the horizontal cross-section at a position corresponding to the height of the shoulders of the seat backs 125L and 125R that are formed so that, when the vicinity of the rear end of the center console 121 is a rear part 111B and the vicinity of the front ends of the seat cushions 123L and 123R is the front part 111F, the rear part 111B and the front part 111F have substantially the same maximum width in the vehicle width direction. At the middle of the rear part 111B and the front part 111F, concave parts 111sL and 111sR are formed at which the width in the vehicle width direction is relatively narrow. Thus, when the vehicle 120 is subjected to a side collision, the shoulders P110b and P111b and the arm for example of the occupants P110 and P111 may be restrained by the concave parts 111sL and 111sR of the airbag lower part 111D having the narrow width in the front-and-rear direction of the vehicle 120.

At the expansion of the airbag 111, the airbag 111 is expanded as shown in FIG. 7 to FIG. 10 to have a three-dimensional shape of substantially dodecahedron in which the airbag upper part 111U is relatively large and the airbag lower part 111D is relatively small. To have such a shape, the airbag 111 is composed of, for example, a front cloth part forming a front face, a top cloth part forming an upper face, a bottom cloth part forming a bottom face, a rear cloth part forming a back face, and left and right side cloth parts forming left and right side faces.

These front cloth part, top cloth part, bottom cloth part, rear cloth part, and left and right side cloth parts are formed, for example, by cutting a flexible cloth sheet to have an appropriate shape to sew the corresponding edges thereof to form a three-dimensional bag-like shape in which the top cloth part is abutted to the vehicle interior ceiling 126 in a relatively large area and the bottom cloth part is abutted to the upper face of the armrest 121H of the center console 121 in a relatively small area. In order to introduce gas from an inflator to the airbag 111 as described above, a gas suction inlet (not shown) is provided in the rear cloth part of the airbag 111 for example.

The airbag 111 of this embodiment expands, at a side collision, from the airbag storage means set at the upper end of the center console 121 as an expansion starting point in the up-and-down and left-and-right direction between the two seats 122L and 122R arranged in the vehicle width direction to reach the shown maximally-expanded status. In the maximally-expanded status of this airbag 111, i.e., at the expansion thereof, the airbag upper part 111U reaches, as described above, to the vicinity of the inner ends of the headrests 126L and 126R in the vehicle width direction provided at the center of the upper parts of the seat backs 125L and 125R. At the same time, the airbag lower part 111D reaches the vicinity of the inner ends of the seat backs 125L and 125R in the vehicle width direction, i.e., the vicinity of the range from the shoulders P110b and P111b to the arm of the occupants P110 and P111. The airbag upper part 111U and the airbag lower part 111D expand in a stepwise manner to expand so as to substantially have the inner outline shapes of the occupants P110 and P111 in the vehicle width direction. As a result, the horizontal distances between the respective parts of the occupants P110 and P111 and the horizontally corresponding position of the airbag 111 is substantially fixed. Thus, at a side collision of the vehicle 120, the occupants P110 and P111 can be uniformly protected and any portion can be prevented from having an extremely-high injury value.

Furthermore, the rear part of the airbag 111 having the maximum width is allowed to completely cover the center console 121 in the vehicle width direction, thereby providing the airbag 111 with an improved restraint performance. This can consequently suppress a situation where, when the vehicle 120 is subjected to a side collision, while the occupant P110/P111 sitting in the seat 122L/122R at the collision opposite side is moving to the collision side, the occupant is caused by the backlash to move toward the vertical part 121V of the center console 121 to strike the center console 121 to thereby have an injury value.

Figure 11:
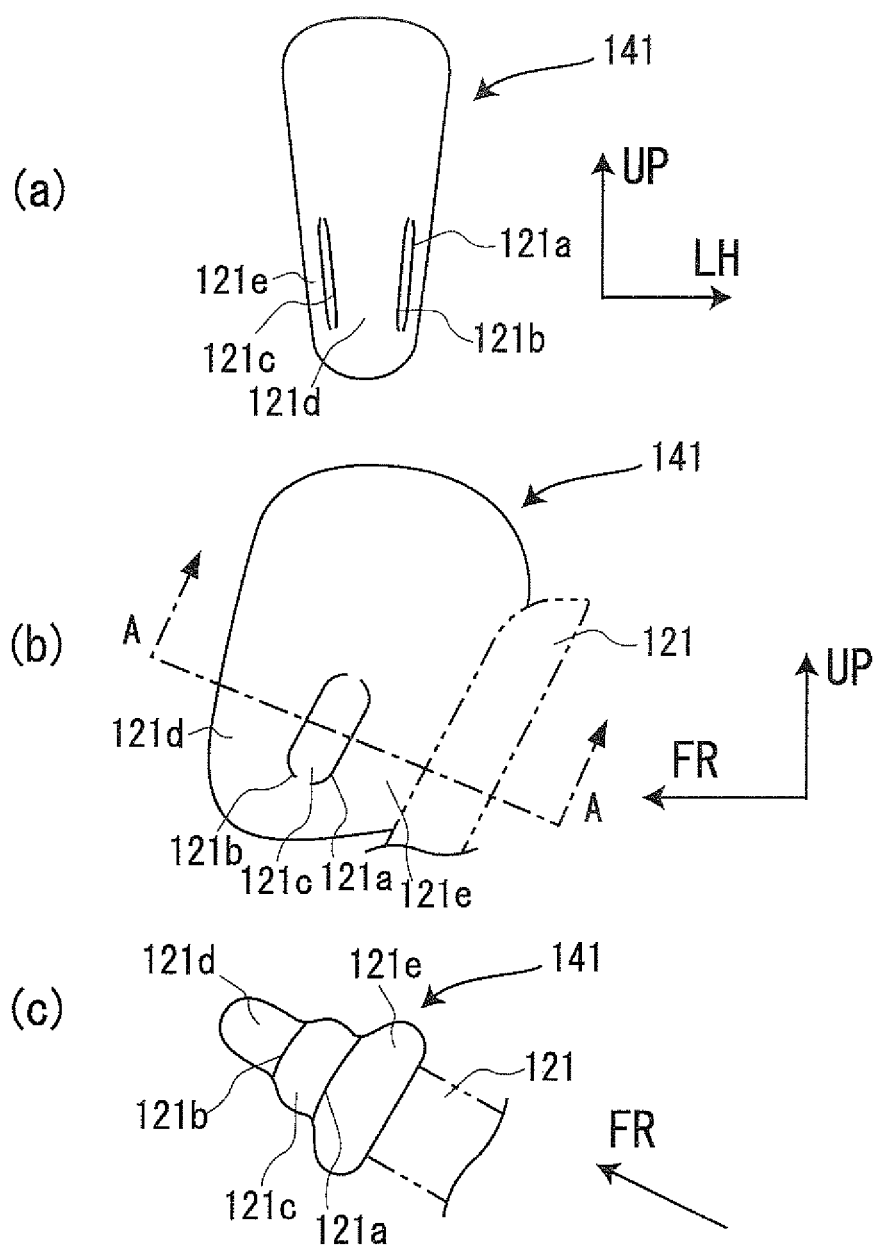
FIG. 11 illustrates the usage status of the airbag of a modification example. (a) is a front view seen from the vehicle front side, (b) is a side view, (c) is a cross-sectional view along A-A in (b).
Figure 12:
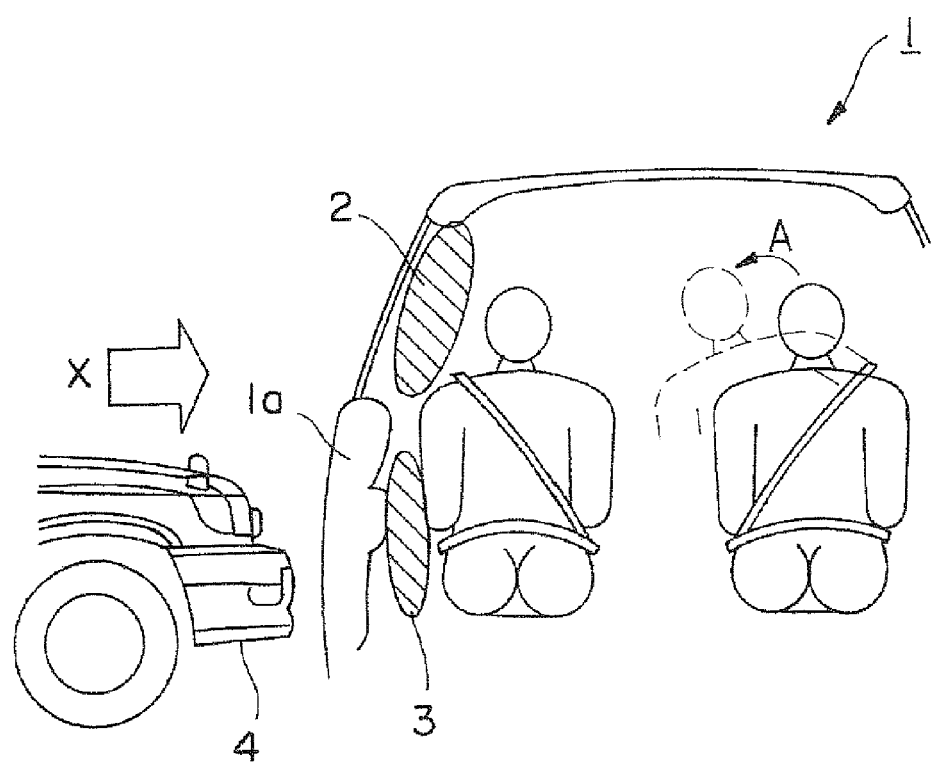
FIG. 12 is a schematic back view illustrating the configuration of an example of a conventional airbag apparatus.

FIG. 11 illustrates an airbag 141 of a modification example. The airbag 141 is expanded from the storage unit provided in the center console 121 to the front side of the vehicle, as in the above-described embodiment. The airbag 141 is structured so that, at the expansion thereof, when seen from the vehicle front side, the lower end has a length in the vehicle width direction that is shorter than that of the upper end, as shown in FIG. 11(a). As shown in FIG. 11(b), the airbag 141 includes tethers 121a and 121b at a position in the vicinity of the center in the front-and-rear direction and at a position slightly lower than the center in the up-and-down direction. The tethers 121*a* and 121*b* define an intermediate region 121*c*.

The tethers 121*a* and 121*b* are a film that divides the airbag 141 while connecting the left and right cloths of the airbag 141. The tethers 121*a* and 121*b* are made of the same material as that of the surface skin of the airbag 141. The tethers 121*a* and 121*b* have upper ends and lower ends that are not joined to each other. Specifically, the intermediate region 121*c* communicates, in the upper ends and the lower ends, with the other spaces in the airbag 141.

By including the tethers 121*a* and 121*b* as described above, the airbag 141 divides a front part region 121*d* as a space at the front side of the intermediate region 121*c* and a rear part region 121*e*. In the horizontal cross section of the tether part as shown in FIG. 11(*c*), the length in the width direction of the airbag 141 is shortest in the front part region 121*d*, second shortest in the intermediate region 121*c*, and longest in the rear part region 121*e*. Specifically, the airbag 141 has the entire shape in which the length in the vehicle width direction at the front end is shorter than the length in the vehicle width direction at the rear end. By providing the tethers in the airbag as described above, the airbag itself can have an arbitrary shape. The tether is not limited to a film-like shape and also may have a string-like shape for limiting the expansion of the airbag.

The invention has been described above. However, the present invention can be carried out in various forms within the scope not deviating from the intention. For example, the airbag shape is not limited to the embodiment. In particular, the airbag may have, at the expansion thereof, a cross-sectional shape that is symmetric in the left-and-right direction and that has both side faces in the vicinity of the middle in the height direction protruding to both sides in the vehicle width direction. Although both side faces are formed to have an angled cross-sectional shape, the invention is not limited to this. Both side faces also may have a circular arc cross-sectional shape in which both side faces in the vicinity of the middle in the height direction are protruded to both sides. The airbag or the inflator of the airbag apparatus may be attached to a partition member through a conventional airbag apparatus attachment structure. When seat backs of left and right seats are configured in an integrated and continuous manner, the airbag apparatus may be attached to the vehicle width center of this seat back or in the upper part in a region between the sitting positions.

In the above-described embodiment, a case is mainly described where the airbag is expanded between the occupants in front seats, i.e., a driver's seat and a front passenger seat. However, the invention is not limited to this. The invention also can be configured to include airbag for rear seats or airbags for respective rows of seats when a plurality of rows of seats, three rows for example, are provided. Furthermore, the invention also can be configured to include airbags to expand in regions among the respective sitting positions or the respective seats when a bench seat where three or more occupants are sitting to form a lateral line is provided or three or more seats are closely arranged in the left-and-right direction.

Although the above-described embodiment has described a so-called passenger vehicle, the invention is not limited to this. For example, the airbag apparatus according to the present invention also can be provided in a large automobile such as a bus or a truck.

What is claimed is:

1. An airbag configured to expand between two seats that are arranged in a vehicle in a direction of vehicle width, wherein the airbag is configured to be installed in a case located behind seating positions of the two seats, and when a gas is provided to the airbag, the airbag is inflated and expanded towards a front side of the vehicle so that an upper end and a lower end of the airbag are positioned on a front side relative to the case, wherein in an expanded state, an outline of a vertical cross section of the airbag taken along the vehicle width direction is shaped to have its widest portions located at a vicinity of a center in a height direction, and wherein in the expanded state, the upper end of the airbag has a substantially flat plateau so as to be securely abutted to an interior ceiling of the vehicle, respective outermost parts of the airbag are arranged between respective inner ends of headrests of the two seats when viewed in a front view from the vehicle front side, and the width of the airbag in the vehicle width direction is gradually decreased from the vicinity of the center in the height direction toward a top so that a space is secured between the airbag in the expanded state and a head and a neck of an occupant.

2. The airbag according to claim 1, wherein in the expansion thereof, the airbag forms a three-dimensional shape composed of a front face, a back face, an upper face, a lower face, and left and right side faces protruding in a convex manner to both sides in the vehicle width direction.

3. The airbag according to claim 1, wherein in the expanded state, the outline of the vertical cross section along the vehicle width direction has a polygonal shape.

4. The airbag according to claim 3, wherein the polygonal shape has a polygonal number of an even number of 4 or more.

5. The airbag according to any of claims 1 to 2, wherein the airbag is planarly configured by two left and right flat fabric cloths.

6. An airbag configured to expand between two seats that are arranged in a vehicle in a direction of vehicle width, wherein the airbag is configured to be installed in a case located behind seating positions of the two seats, and when a gas is provided to the airbag, the airbag is inflated and expanded from the case towards a front side of the vehicle so that an upper end and a lower end of the airbag are positioned on a front side relative to the case, wherein the airbag has an outline shape in a front view as seen from the front side of the vehicle in an expanded state that is composed of an airbag upper part that forms a part above a height position corresponding to a shoulder of a seat back of each of the two seats and an airbag lower part that forms a part below the height position corresponding to the shoulders of the seat backs and that protects a shoulder and an arm of an occupant, the airbag upper part has outermost parts expanded up to a vicinity of an inner end of a headrest of each of the seat backs in the vehicle width direction in the front view, the airbag lower part has the outermost parts expanded up to a vicinity of respective inner ends of the left and right seat backs in the vehicle width direction in the front view, and the air bag upper part and the air bag lower part are configured and shaped to be connected to each other in a stepwise manner so as to retain the head, the neck and a chest of the occupant at substantially the same timing when deployed, wherein in the expanded state, the upper end of the airbag has a substantially flat plateau so as to be securely abutted to an interior ceiling of the vehicle, and wherein in the expanded state, a cross-section of the airbag lower part that is taken along a substantially horizontal plane located below and adjacent to the height position corresponding to the shoulder of the seat back has a recess to accommodate the shoulder and arm of the occupant on each side at a position on a front side of the seat back.

7. The airbag according to claim 6, wherein the airbag is configured, in the expanded state thereof, so that an upper face of the airbag upper part is abutted to the interior ceiling of the vehicle and a lower face of the bag lower part is abutted to an upper face of an armrest of a center console.

8. The airbag according to claim 7, wherein the airbag upper part has an outline shape in a horizontal cross-section in a maximum width portion in the vehicle width direction, the outline shape has a backmost portion in the vicinity of the backmost part of the center console and completely covers the backmost part of the center console in the vehicle width direction in the maximum width portion, the airbag upper part has a reduced width toward the front side so as to form the airbag upper part has a bell shape with a narrow tip end.

9. The airbag according to claim 7 or 8, wherein the airbag lower part is configured so that a width in the vehicle width direction is wider than the width of the center console in the vehicle width direction, an outline shape in a horizontal cross-section at a position corresponding to the shoulder of the seat back of each of the two seats has a rear part in the vicinity of the backmost part of the center console and a front part in the vicinity of the front end of a seat cushion of the seat so that the rear part and the front part have substantially the same maximum width in the vehicle width direction, and an intermediate portion of the rear part and the front part has a relatively narrow width in the vehicle width direction.

10. An airbag configured to expand between two seats that are arranged in a vehicle in a direction of vehicle width, wherein the airbag is configured to be installed in a case located behind seating positions of the two seats, and when a gas is provided to the airbag, the airbag is inflated and expanded from the case towards a front side of the vehicle so that an upper end and a lower end of the airbag are positioned on a front side relative to the case, wherein the airbag has an outline shape in a front view as seen from the front side of the vehicle in an expanded state that is composed of an airbag upper part that forms a part above the height position corresponding to a shoulder of a seat back of the each of the two seats and an airbag lower part that forms a part below the height position corresponding to the shoulder of the seat back of each of the two seats, the airbag upper part has outermost parts expanded up to a vicinity of an inner end of a headrest of each of the seat backs in the vehicle width direction in the front view, the airbag lower part has outermost parts expanded up to a vicinity of respective inner ends of the two seat backs in the vehicle width direction in the front view, and the air bag upper part and the air bag lower part are configured and shaped to be connected to each other in a stepwise manner so as to retain a head, a neck and a chest of the occupant at substantially the same timing when deployed, and wherein in the expanded state, a cross-section of the airbag lower part that is taken along a substantially horizontal plane located below and adjacent to the height position corresponding to the shoulder of the seat back has a recess to accommodate a shoulder and an arm of the occupant on each side at a position on a front side of the seat backs.

\* \* \* \* \*